United States Patent

[11] 3,617,709

| [72] | Inventor | Hirohito Tone<br>Naka-gun, Japan |
|---|---|---|
| [21] | Appl. No. | 811,333 |
| [22] | Filed | Mar. 28, 1969 |
| [45] | Patented | Nov. 2, 1971 |
| [73] | Assignee | Nihon Genshiryoku Kenkyusho<br>Tokyo, Japan<br>Continuation-in-part of application Ser. No.<br>511,755, Dec. 6, 1965, now abandoned. |

[54] APPARATUS FOR DETECTING FAILURES OF NUCLEAR FUEL ELEMENTS
9 Claims, 5 Drawing Figs.

[52] U.S. Cl. .................................................. 250/83.6, 250/43.5
[51] Int. Cl. .................................................. G01t 1/18
[50] Field of Search ............................................ 250/83.6 FT, 41.9 S, 43.5 MR, 83.3

[56] References Cited
UNITED STATES PATENTS

| 3,084,252 | 4/1963 | Goupil et al. ............... | 250/83.6 FT |
| 3,116,211 | 12/1963 | Smith ........................ | 250/83.6 FT |

*Primary Examiner*—Archie R. Borchelt
*Assistant Examiner*—David C. Nelms

ABSTRACT: An apparatus is provided for detecting failures in nuclear fuel elements. Specific measurement of Krypton and Xenon as gaseous nuclear fission products is achieved by separating these elements from other coexisting radioactive elements and measuring the beta rays emitted from the Krypton and Xenon thus separated with a high counting efficiency. Separation is provided by passing the combined gases through separate columns filled with molecular sieve materials, or activated charcoal, in combination with a carrier Q-gas as used in a gas flow counter.

INVENTOR.
Hirohito Tone
BY
Oblon & Oblon
Attorneys

APPARATUS FOR DETECTING FAILURES OF NUCLEAR FUEL ELEMENTS

This application is a continuation-in-part of my prior application Ser. No. 511,755, filed Dec. 6, 1965 now abandoned.

This invention relates to apparatus for detecting failures of nuclear fuel elements which may take place during operation of a nuclear reactor.

Any delay in detection of a failure of nuclear fuel elements during operation of a nuclear reactor causes release of a large quantity of nuclear fission products into coolant and moderator. Such contamination within the nuclear reactor apparently makes the maintenance of the reactor markedly difficult. Accordingly, it is necessary to detect any failure of fuel elements as soon as possible. A conventional procedure of detecting fuel failures is to measure the radiation of nuclear fission products released by the fuel failure into the coolant and moderator and the gas phase in the reactor. However, in the moderator and coolant, there are included different radioactive nuclides produced by the nuclear reaction of the materials with thermal neutrons and due to the presence of such radioactive nuclides in addition to the nuclear fission products the conventional procedure of detecting fuel failures has been unsatisfactory in sensitivity and lacked reliability.

The present invention has for its object to provide an apparatus for detecting failures of nuclear fuel elements which is reliable and highly sensitive. This objective is attained according to the present invention with particular attention paid to krypton and xenon as gaseous nuclear fission products by separating these elements from other coexisting radioactive elements and measuring the $\beta$-rays emitted from the krypton and xenon thus separated with a high counting efficiency. As all of the krypton and xenon occurring in a nuclear reactor are fission products of $U^{235}$, it will be recognized that any failure of nuclear fuel elements can be detected according to the present invention with substantial accuracy by detection of such krypton and xenon, without being influenced by the presence of any other radioactive nuclides.

Next, the principles of the apparatus according to the present invention will be described. It has been found that a gas mixture of Ar (argon), Kr (krypton) and Xe (xenon) can be separated into individual gases by passing it through a column filled with M.S.-5A (molecular sieve-5A), M.S.-13X (molecular sieve-13X), or activated charcoal employing as a carrier gas a Q-gas as used in a gas flow counter. As is well understood by those familiar with the art, the molecular sieve materials are synthesized inorganic absorbents. The Q-gas is a mixture of helium and methane, and is produced by mixing about 1 percent methane with 99 percent helium. In the past, Q-gas has been used for a gas flow counter which is a type of radioactivity measuring device. In particular, the fact that Ar can be separated from Kr and Xe when the Q-gas is employed as a carrier gas is very important to the apparatus of the present invention. That is, since the gas phase in a reactor includes $Ar^{41}$ and other radioactive nuclides in addition to the nuclear fission products, measurement of the activity of Kr and Xe necessitates separation of $Ar^{41}$ from Kr and Xe to eliminate any influence of $Ar^{41}$ upon such measurement. In addition, according to the procedure Kr and Xe can be separated from each other for individual detection. This makes it possible to detect fuel failures without any danger of misconception. The most important advantage of the present invention is that $\beta$-rays as emitted from Kr and Xe can be measured with a high counting efficiency by introducing Kr and Xe gases separately into respective gas flow counter-type detectors together with the Q-gas.

The above and other objects, feature and advantages of the present invention will become apparent from the following description when taken in conjunction with the accompanying drawing, in which.

Figure 1:
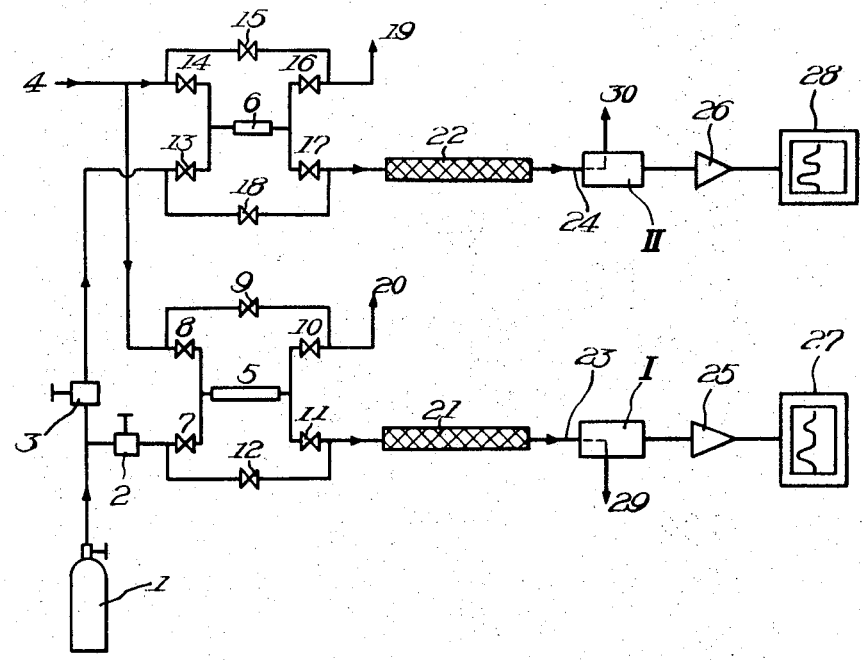
FIG. 1 is a schematic diagram illustrating an apparatus for detecting failures of nuclear fuel elements embodying the present invention.

Referring first to FIG. 1, reference numeral 1 indicates a Q-gas bomb provided with flow-regulating valves 2 and 3. Reference numerals 5 and 6 indicate sampling tubes, for gases to be measured; and 7 through 18 indicate respective electromagnetic or solenoid valves. A column 21 is filled with MX-13X while another column 22 is filled with MS-5A or activated charcoal. Kr and Xe detectors 23 and 24 are connected with the respective columns 21 and 22 and also with rate meters 25 and 26, respectively, which in turn are connected with recorders 27 and 28, respectively. Gases to be measured enter the system at an inlet 4, which is connected to a reactor (not shown). The numerals 29 and 30 indicate outlets for Q-gas.

In operation, the Q-gas from the bomb 1, passing flow-regulating valves 2 and 3, proceeds through sampling tubes 5 and 6 and enters the respective columns 21 and 22. On this occasion, the gases to be measured, which has previously been stored in the sampling tubes 5, 6 and include Ar Kr and Xe, are carried therefrom into the respective columns 21 and 22 by the Q-gas. With the Q-gas employed as a carrier gas, Ar and Kr are separated from each other by the molecular sieve 5A or activated charcoal and measured individually by the detector. That is, Ar is first detected and then Kr is detected after an appropriate time of approximately three minutes. On the other hand, Xe, having a higher absorption characteristic to either filler material, is held therein for an extremely long period of time as compared to Ar and Kr and issues considerably later. With the filler material MS-13X, and in case the Q-gas is employed as a carrier gas, Ar and Kr can hardly be separated from each other, but Kr and Xe are separated with an appropriate time interval therebetween. Thus, the gases to be measured are separated during passage through the column 21, filled with MS-13X, into a gas mixture of Ar and Kr, on one hand, and the Xe gas, on the other hand, with an appropriate time interval therebetween. Thus, first the mixture of Ar and Kr and then the Xe gas enter the detector 23 together with the Q-gas. The time interval between the separation of the mixture of Ar and Kr and that of Xe can be appropriately selected by varying the length of the column, thereby to enable the detector 23 to count the radioactivity of the mixture of Ar and Kr and that of Xe in a separate fashion. These radioactivity values, passing through the rate meter 25, are recorded on the recorder 27. In the other column 22, which is filled with MS-5A or activated charcoal, as described above, separation of Ar and Kr can be effected with an appropriate time interval by properly selecting the length of the column so that first Ar and then Kr are passed together with the Q-gas into the detector 24, where their radioactivity can thus be counted separately. The radioactivity values thus counted are then recorded on the recorder 28. It is to be noted that with a constant rate of flow of the Q-gas the peaks of Ar, Kr and Xe appear on the recorders 27 and 28 at all times at fixed locations thereon.

Figure 4:
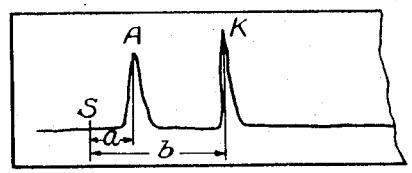
FIGS. 4 and 5 illustrate respective examples of charts recorded on the two recorders in the apparatus.
Figure 5:
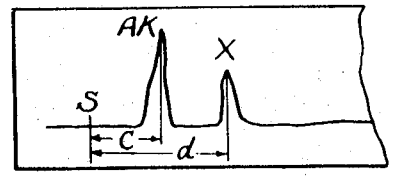

In other words, the curve plotted on the chart carried by one of the recorders 28 includes a peak A for Ar and a peak K for Kr, as illustrated in FIG. 4. Similarly, the curve plotted on the chart on the other recorder 27 carries a peak AK for the mixture of Ar and Kr and a peak X for Xe. The peaks A, K, AK and X on the two charts are located at respective distances (or time spaces) $a$, $b$, $c$ and $d$ from the point S, where the measurement has been started.

Thus, the presence of Ar Kr and Xe can be confirmed by locating the peaks for Ar, Kr and Xe, which at all times appear on the two charts at their definite locations. Also, the height of each of the peaks represents the concentration of the corresponding gases.

It will thus be appreciated that in any fuel failure, four peaks for Ar, Kr, Xe gases and the Ar-Kr mixture are visually obtainable by the method employing two columns and thus, each fuel failure can be detected without fail by use of the apparatus of the present invention.

For continuous operation of the apparatus shown in FIG. 1, solenoid valves 7, 9, 11, 13, 15 and 17 are first closed while opening the remaining ones 8, 10, 12, 14, 16 and 18 so that the gases to be measured are allowed to enter the system through its inlet 4 to be stored in the sampling tubes 5 and 6. Then, the solenoid valves previously closed are opened and the previously opened ones closed to direct the gases stored in the sampling tubes 5 and 6 into the columns 21 and 22, respectively, for measurement. The solenoid valves can be opened and closed in an automatic fashion for periodic measurement of the gases at predetermined time intervals.

Figure 2:
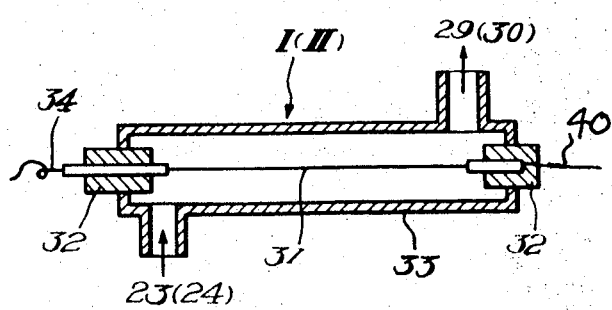
FIGS. 2 and 3 are enlarged cross-sectional views of respective forms of detector usable in the apparatus (as indicated by the numeral II in FIG. 1)
Figure 3:
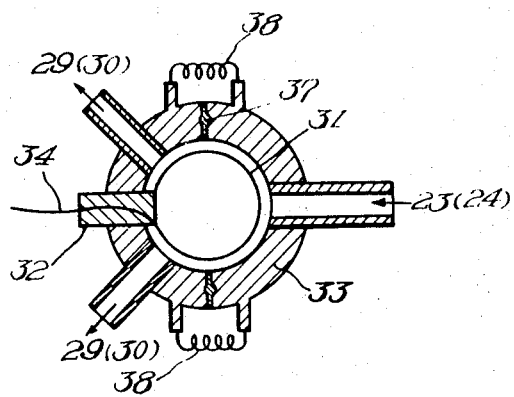

Reference will next be made to FIGS. 2 and 3, which illustrate two forms of detector shown at I, II in FIG. 1. FIG. 2 shows a cylindrical detector while FIG. 3 shows a spherical one. In these figures, reference numeral 31 indicates an electrode in the form of a thin tungsten wire supported at opposite ends by insulators 32. The detector has an inlet 23 (24) and an outlet 29 (30) for Q-gas. The cylindrical or spherical body 33 is a casing made of metal and also serves as an electrode. A lead wire 34 is connected to the tungsten electrode. The casing 33 of the unit shown in FIG. 3 comprises a structure dividable into two halves, the two half sections being fastened together with a packing 37 interposed therebetween. Spring means 38 are provided to secure sealing engagement between the two half sections. The casing structure of FIG. 3 is advantageous in that it can readily be split into two sections for decontamination. The casting of FIG. 3 has two or, if desired, three outlets to enable the Xr and Xe gases previously admitted into the casing to flow smoothly out of the detector. A voltage of from 1,000 v. to 1,500 v. is applied to the tungsten electrode 31 in FIGS. 2 and 3.

The Ar, Kr and Xe gases separated in the columns 21 and 22 shown in FIG. 1 are introduced together with the Q-gas into the detectors through their inlets 23 (24) (FIG. 2 or 3). This gives an extraordinarily high counting efficiency since the $\beta$-rays emitted from Ar, Kr and Xe previously introduced into the detectors together with the Q-gas are absorbed nearly completely within the detectors. The counting efficiency obtainable with this method for Ar, Kr and Xe is in the range between 70 percent and 90 percent.

It will be appreciated from the foregoing that according to the present invention an apparatus for detecting failures of nuclear fuel elements is provided which is high in detection sensitivity and operable to detect any fuel failure with accuracy. Particularly, the inventive apparatus has a counting efficiency of from 70 percent to 90 percent, which is approximately five times as high as that of the conventional method, which can only be estimated at most 15 percent. Moreover, the apparatus of the present invention is highly reliable as means for detecting fuel failures since it is capable of detecting Kr and Xe occurring nuclear fission products in an exclusive manner whereas the conventional detecting method has had only an extremely limited reliability under the adverse effects of radioactive nuclides coexisting with the nuclear fission products.

Members 19 and 20 are controllable exhaust lines for the system.

A signal from the DC charged electrodes 31 provided by the gas passing through the detectors I, II, is transmitted to the rate meters 25 and 26 and the outputs therefrom flow to the automatic recorders 27 and 28, respectively. The recorders indicate variations in voltages in the range of about, for example, 0 to 10 mv.

Molecular sieve materials 5A and 13X are known in the industry, and for example, can be obtained from the Linde Company, Division of Union Carbide Corporation. The materials are porous synthesized zeolites. Molecular sieve material 5A is produced from type 4A molecular sieve material through ion exchange of about 75 percent of the sodium ions by potassium and calcium ions respectively. The general chemical formula for type 4 A material is $0.96 \pm 0.04$ $Na_2O \cdot 1.00$ $Al_2O_3$ $\cdot 1.92$ $\pm 0.09$ $Si O_2 \cdot XH_2O$. The chemical formula for molecular sieve material 13X is $0.83 \pm 0.05$ $Na_2O_3 \cdot 1.00$ $Al_2O_3 \cdot 2.48 \pm 0.03$ $SiO_2 \cdot XH_2O$. The materials are disclosed in U.S. Pat. Nos. 2,882,243 and 2,882,244.

The electrodes 31 have leads, such as lead 40, connecting the same to the rate meters 25 and 26, which have amplifying and/or filter functions.

It is to be understood that the present invention is not to be restricted to the details set forth herein but many changes and modifications can be made without departing from the spirit and scope of the invention as defined in the annexed claims.

What is claimed is:

1. An apparatus for detecting failure of nuclear fuel elements by determining the argon, krypton and xenon content thereof and comprising
   a column having molecular sieve material 13X therein,
   a second column having a material from the group consisting of activated charcoal and molecular sieve material 5A therein,
   means for supplying volumes of nuclear fuel gases including argon, krypton and xenon mixed with Q-gas to each of said columns,
   said first column retaining the xenon gases therein longer than a mixture of argon and krypton gases,
   said second column retaining the xenon gases therein for a relatively long time and readily passing argon therethrough but retaining the krypton and therein for several minutes,
   a pair of means for detecting the radioactivity of said gases as released from said columns separately attached thereto, and
   recorder means for recording the radioactivity of said gases passing through said means for detecting.

2. An apparatus according to claim 1 where each means for detecting the radioactivity is
   a cylindrical housing acting as an electrode,
   a thin wire centrally positioned in insulated relation to the housing action as another electrode, and
   connection means to pass the gases from its respective column through the housing to surround the thin wire before passing therefrom.

3. An apparatus according to claim 2 where the thin wire is made from tungsten.

4. An apparatus according to claim 1 which includes means to selectively control the passage of gases to the two columns.

5. An apparatus according to claim 1 where each means for detecting the radioactivity is
   a split hollow spherical housing acting as an outer electrode,
   removable means to resiliently hold the sphere together,
   an inner electrode positioned in insulated relation within the sphere, and
   means to pass the gases from a respective column into the hollow interior of the sphere to surround the inner electrode and out again.

6. A method for detecting failure of nuclear fuel elements by determining the argon, krypton and xenon content of gaseous nuclear fission products including argon, xenon and krypton and comprising the steps of
   mixing a Q-gas as a carrier with the gaseous fission products,
   separating the gases into two volumes,
   passing one of said volumes through molecular sieve material 13X,
   passing the second of said volumes through a material from the group consisting of activated charcoal and molecular sieve material 5A,
   said sieve material 13X retaining the xenon gases in said second volume for a relatively long time, but readily passing argon gases therethrough while retaining the krypton gases therein for several minutes, but for less of a time period than the xenon gases, and
   detecting the radioactivity of said gases as released from said materials separately connected to said volumes.

7. A method according to claim 6 including the steps of recording the radioactivity of said gases.

8. A method according to claim 6 including the step of selectively controlling the flow of Q-gas and the gaseous nuclear fission products to and passage through the molecular sieve materials.

9. A method according to claim 6 including the step of retaining the xenon gas in the molecular sieve material 13X a longer time than a mixture of argon and krypton gases.

* * * * *